United States Patent [19]
Ezell

[11] Patent Number: 5,991,887
[45] Date of Patent: Nov. 23, 1999

[54] LOW POWER WAKE UP CIRCUITRY, WITH INTERNAL POWER DOWN OF THE WAKE UP CIRCUITRY ITSELF

[75] Inventor: Richard William Ezell, Carrollton, Tex.

[73] Assignee: Dallas Semiconductor Corporation, Dallas, Tex.

[21] Appl. No.: 09/136,787

[22] Filed: Aug. 19, 1998

Related U.S. Application Data

[63] Continuation of application No. 08/608,227, Feb. 28, 1996, abandoned.

[51] Int. Cl.$^6$ .................. G06F 1/24; G06F 1/26; G06F 1/32
[52] U.S. Cl. .................. 713/340; 713/324; 327/143
[58] Field of Search .................. 395/750.08, 750.07, 395/750.01; 327/143, 198; 713/340, 330, 324, 300, 1; 714/22; 326/46

[56] References Cited

U.S. PATENT DOCUMENTS

| | | | |
|---|---|---|---|
| 5,166,545 | 11/1992 | Harrington | 327/143 |
| 5,230,056 | 7/1993 | Hoshina | 395/750.08 |
| 5,319,255 | 6/1994 | Garverick et al. | 327/143 |
| 5,341,503 | 8/1994 | Gladstein et al. | 395/750.08 |
| 5,414,380 | 5/1995 | Floyd et al. | 327/198 |
| 5,442,794 | 8/1995 | Wisor et al. | 395/750.08 |
| 5,539,910 | 7/1996 | Brueckmann et al. | 395/750.08 |
| 5,546,589 | 8/1996 | Odaira | 395/750.08 |
| 5,576,650 | 11/1996 | Hirotani et al. | 327/142 |

*Primary Examiner*—Gopal C. Ray
*Attorney, Agent, or Firm*—Jenkens & Gilchrist, A. Professional Corporation

[57] ABSTRACT

An initializer that responds to change in a power supply potential level, for generating an initialize signal to initialize a circuit to a select state, the initializer includes a power-on reset circuit that switches between an active and a powered-down state, and is for generating the initialize signal. The initializer also includes a wake-up circuit that monitors the power supply potential level and switches the power-on reset circuit from the powered-down state to the active state when selected change in the power supply potential level occurs.

6 Claims, 3 Drawing Sheets

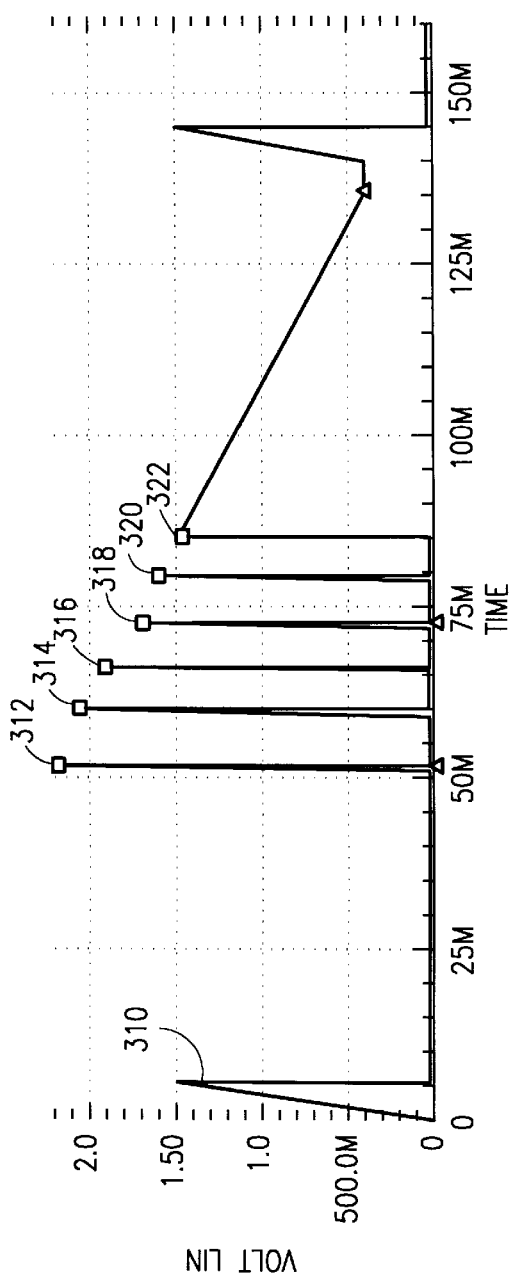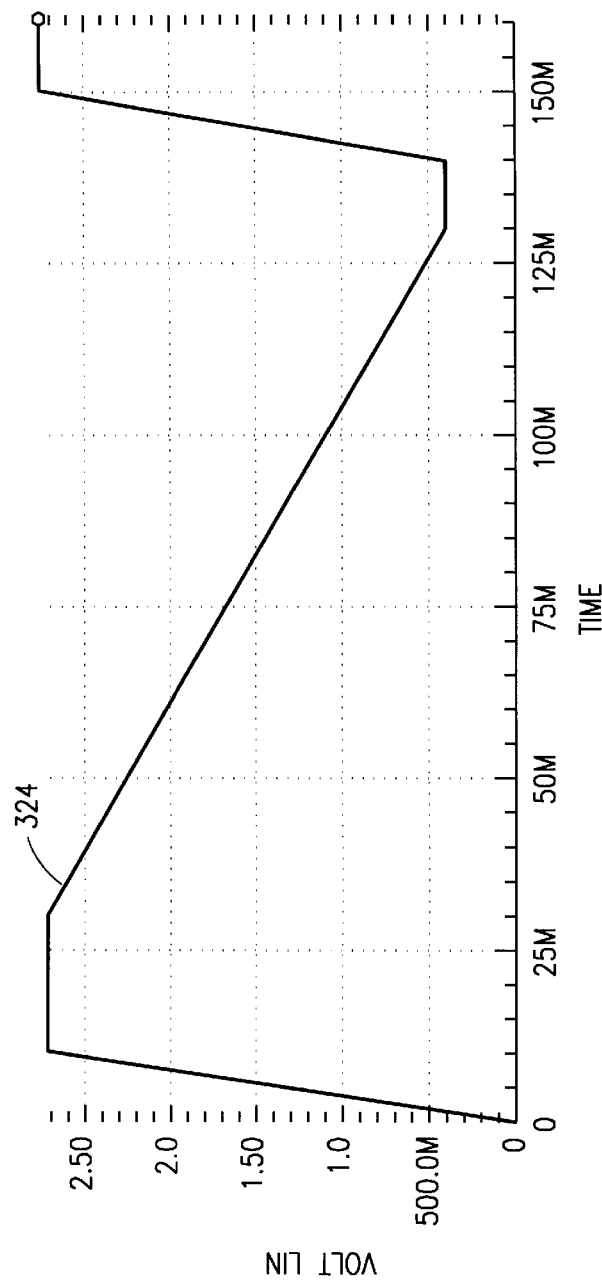

… … …

LOW POWER WAKE UP CIRCUITRY, WITH INTERNAL POWER DOWN OF THE WAKE UP CIRCUITRY ITSELF

This application is a continuation of application Ser. No. 08/608,227, filed Feb. 28, 1996, abandoned.

FIELD OF THE INVENTION

This invention relates to wake-up circuits, and more particularly, to a wake-up circuit utilizing a voltage decay detector and a signal generator to detect change in a power supply potential level and to switch a device from a powered-down state to an active state when such change is detected.

BACKGROUND OF THE INVENTION

With certain electronic devices there are many functions which may need to be performed at initial power-on, such as self-testing, clearing data from memory and restoring elements to a know state. Thus many types of electronic devices include a power-on reset (POR) circuit. A POR circuit generally detects when power is applied to a device and then issues a reset pulse or signal which is used to initiate the above functions.

Many electronic devices, such as low power devices, utilize a zero power stand-by mode in which parts of the device not needed during normal operation are shut off to conserve power consumption by the device. Consequently, some internal POR circuits have been made to shut off and thereby draw no current once they have properly reset a device after a power-up sequence has been performed.

One method of operation used by current POR circuits during the power-up of an electronic device has the POR circuit generating a reset signal for the electronic device during the power-up until the operating voltage of the electronic device reaches a certain threshold. Once the threshold is reached, the POR circuit switches to the stand-by or powered-down state. The POR circuit will then remain in the powered-down state until the operating voltage of the electronic device has returned to zero volts.

However, a problem arises when the operating voltage of the electronic device fluctuates and decays below the threshold but does not decay completely to zero volts. If this occurs, any subsequent rise in the operating voltage will not trigger the POR circuit to reset the electronic device, thereby placing the electronic device in an unknown state.

Past and current POR circuit technologies that monitor the operating voltage for in-tolerance conditions, monitor the operating voltage at all times, thereby utilizing "stand-by" current. This creates an additional problem with low powered devices, because, as described above, for low power devices minimum power consumption is often critical.

Therefore, a POR circuit is needed having a powered-down state that can be activated anytime the operating voltage is low enough for an incorrect operation of the electronic device to result and still be able to monitor the threshold voltage with minimum power consumption.

SUMMARY OF THE INVENTION

The present invention overcomes the above identified problems as well as other shortcomings and deficiencies of existing technologies by providing circuitry to detect change in a power supply potential level and to switch a power-on reset circuit from a powered-down state to an active state, while maintaining minimum power consumption.

Accordingly, it is an object of the present invention to provide a wake-up circuit having a voltage decay detector for monitoring change in a power supply potential level, and having a signal generator to generate a pulse to switch a device from a powered-down state to an active state when change in the power supply potential level is detected.

It is a further object of the present invention to provide an initializer having a power-on reset circuit that switches between a powered-down state and an active state when change in a power supply potential level is detected.

In accordance with the above and other objects there is provided a wake-up circuit that is operable in response to change in a power supply potential level, that generates a wake-up signal to switch the state of a component from a stand-by state to an active state. The wake-up circuit includes a voltage decay detector that detects change in the power supply potential level and includes a signal generator that generates the wake-up signal used switch the state of the component from the stand-by state to the active state when change in the power supply potential level is detected. The wake-up circuit has no appreciable stand-by power.

There is further provided an initializer that is operable in response to change in a power supply potential level, that generates an initialize signal to initialize a circuit to a selected state. The initializer includes a power-on reset circuit that generates the initialize signal and is switchable between a stand-by state and an active state. The initializer also includes a detector that detects the change in the power supply potential level and includes a signal generator that generates a wake-up signal when change in the power supply potential level is detected. The wake-up signal switches the power-on reset from the stand-by state to the active state.

BRIEF DESCRIPTION OF THE DRAWINGS

A more complete understanding of the present invention may be had by reference to the following Detailed Description when taken in conjunction with the accompanying Drawings wherein:

FIGS. 3A & 3B are graphs illustrating an example of operation of the present invention.

DETAILED DESCRIPTION

Figure 1:
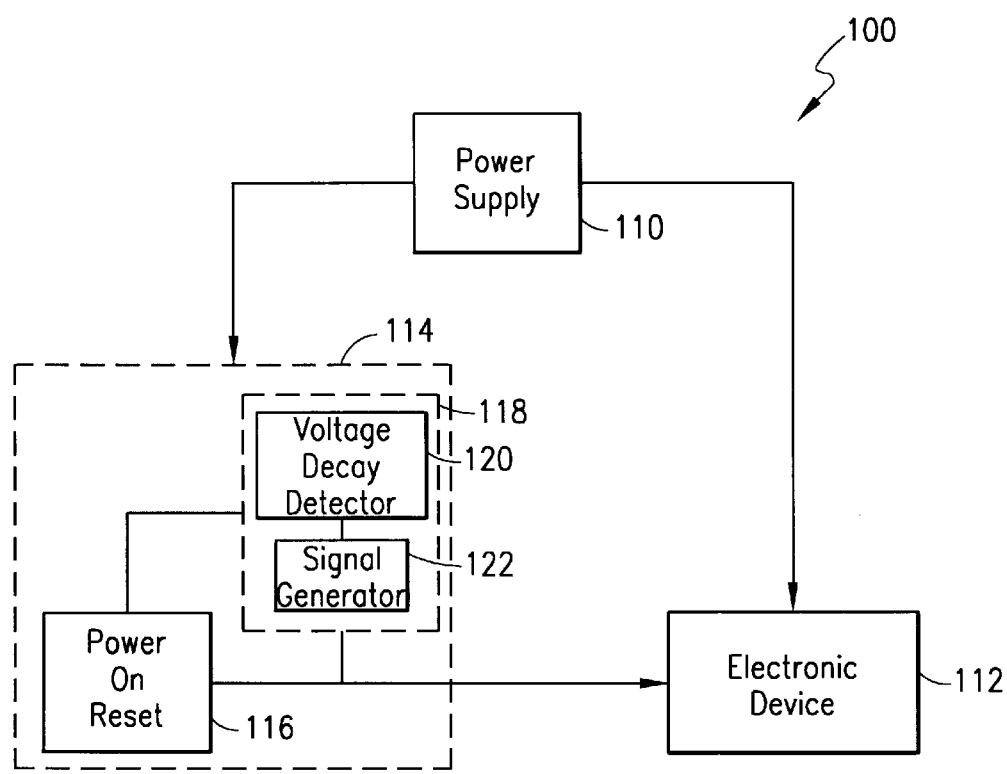
FIG. 1 is a block diagram illustrating a system utilizing the present invention.

Referring now to the drawings where like or similar elements are designated with identical reference numerals throughout the several views, and in particular, to FIG. 1, there is shown a block diagram illustrating a system 100 utilizing the present invention. System 100 includes a power supply 110, an electronic device 112, and an initializer 114. Both electronic device 112 and initializer 114 generally derive their power from power supply 110.

Initializer 114 includes a power-on reset (POR) circuit 116 connected to a wake-up circuit 118. It is preferred that POR circuit 116 be a power-on reset circuit having a stand-by state, and an active state wherein when in the stand-by state, power consumption by the POR circuit can be minimized.

In general operation, wake-up circuit 118 detects and responds to a select amount of change in voltage potential of power supply 110. Wake-up circuit 118 then switches POR 116 circuit from the stand-by state to the active state. POR circuit 116 then checks the voltage potential of power supply 110 to see if it has fallen below a minimum operating potential level. If the voltage potential of power supply 110 does fall below the minimum operating potential level, POR circuit 116 generates the initialize signal. A more detailed description of the operation of system 100 is given below.

Wake-up circuit 118 includes a voltage decay detector 120 for detecting change in voltage potential levels of power supply 110, and also includes a signal generator 122 for generating the signal or pulse to switch POR circuit 116 from the powered-down state to the active state.

Figure 2:
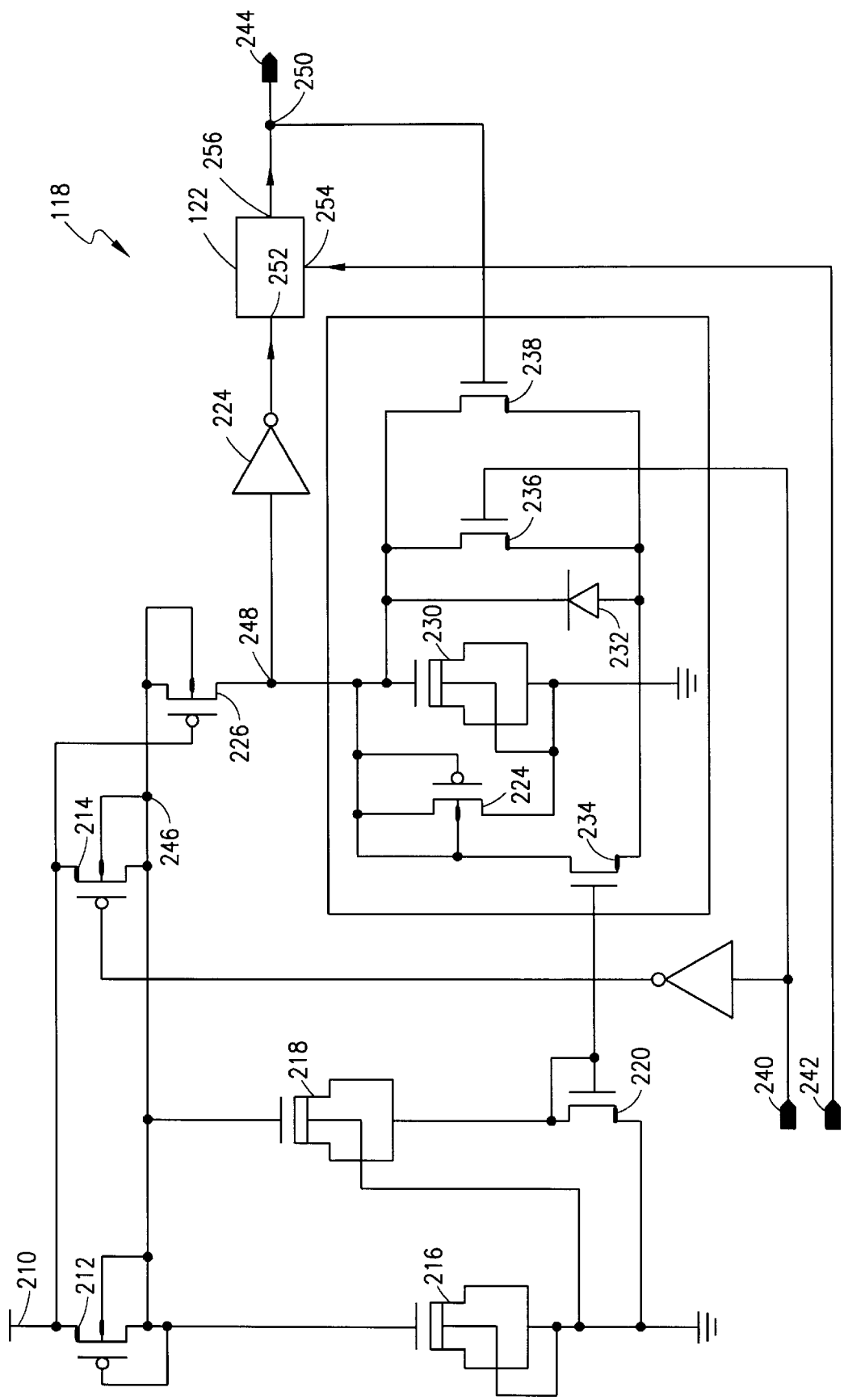
FIG. 2 is a schematic diagram illustrating an embodiment of a voltage decay detector and a signal generator of the present invention.

Referring now to FIG. 2, there is shown a more detailed schematic of wake-up circuit 118. As depicted, wake-up circuit 118 includes signal generator 122, power terminal 210, p-channel FETs 212 and 214, n-channel depletion capacitors 216 and 218, an n-channel MOS transistor 220, inverters 222 and 224, p-channel FETs 226 and 228, an n-channel depletion capacitor 230, diode 232, n-channel MOS transistors 234, 236 and 238, input terminals 240 and 242, and output terminal 244.

Power terminal 210 is connected to power supply 110, input terminals 240 and 242 are connected to POR circuit 116, and output terminal 244 is connected to POR circuit 116 for sending the wake-up signal to POR circuit 116. For signal generator 122, good results have been achieved using standard one shot pulse generators that produce a single pulse of finite length. However, it is contemplated to be within the scope of this invention that other types of signal or pulse generators could be used.

A node 246, from where the decay of Vdd will be monitored, is formed from the connections of the gates of capacitors 216 and 218, the gate, drain and substrate connections of FET 212, the drain and substrate connections of FET 214, and the source and substrate connection of FET 226.

A triggering node 248, from where signal generator 122 will be triggered, is formed from the connections of the source, gate, and substrate connections of FET 228, the gate of capacitor 230, a first end of diode 232, the drain of MOS transistor 236 and the drain of MOS transistor 238.

A node 250 is formed from the connections, of the output terminal 244 and the gate of MOS transistor 238.

Signal generator 122 includes two inputs 252 and 254, and an output 256. Input 254 of signal generator 122 is connected to input terminal 242, which is ultimately connected to POR circuit 116. Input 252 of signal generator 122 is connected to the output of inverter 224, and output 256 of signal generator 122 is connected to output terminal 244.

OPERATION

Referring now to FIGS. 1 and 2, an example of a detailed operation of system 100 will now be described. As a starting point, it will be assumed that there is no voltage across either electronic device 112 or initializer 114. When power is supplied from power supply 110, there is a finite amount of time that it takes the operating voltage or Vdd to ramp up from 0 volts to the operating voltage. After POR circuit 116 detects Vdd and as Vdd ramps up, POR circuit 116 will be in an active state and will be sending an initializing signal to electronic device 112. In response to this initializing signal, for example, electronic device 112 will be reset to a predetermined initial state. Once Vdd reaches a predetermined threshold voltage, generally the minimum operating voltage for electronic device 112, POR circuit 116 will automatically switch from the active state to the powered-down state to minimize power consumption.

When VDD reaches the minimum operating voltage, voltage decay detector 120 of wake-up circuit 118 will then monitor Vdd for any decrease in the potential level. When Vdd decreases a predetermined amount, 0.5 volts for example, voltage decay detector 120 will trigger signal generator 122 to send a wake-up pulse of a certain length to POR circuit 116. This pulse will switch POR circuit 116 from the powered down state to the active state. It will also reset the voltage decay detector 120 to allow continued monitoring for any further decrease in Vdd. POR circuit 116 then checks the level of Vdd. If Vdd is above the minimum operating voltage, POR circuit 116 will switch back to the powered-down state.

So long as Vdd is above the minimum operating voltage, wake-up circuit 118 and POR circuit 116 will continue and repeat this operation as Vdd decreases. As an example wake-up circuit 118 would generate one pulse for every 0.5 V that Vdd decreases.

However, when Vdd decays below the minimum operating voltage of electronic device 112, and when wake-up circuit 118 switches POR circuit 116 from powered-down to active, POR circuit 116 will check the level of Vdd, and determine that it is below the minimum operating voltage. POR circuit 116 will stay active to generate the initialize signal used to reset electronic device 112.

Referring now to FIG. 2, a more detailed description of the operation of wake-up circuit 118 will now be given. In operation power supply 110 charges capacitors 216 and 218 as Vdd ramps up to its operating voltage. The voltage at node 246 will then be equal to, the greater of Vdd minus the voltage drop on the substate diode of FET 212 or Vdd minus the p-channel threshold voltage of FET 212. The voltage on node 248 will remain at zero volts due to FETs 234, 236 and 228. As Vdd starts to decay, the voltage at node 246 will remain high due to the charge on capacitors 216 and 218. The voltage at node 246 then becomes a reference voltage to which Vdd is compared as it decays.

When Vdd decays below the reference voltage at node 246 by an amount equal to the p-channel threshold voltage of FET 226, FET 226 will turn on. When FET 226 turns on, capacitor 230 will begin to charge, causing the voltage on node 248 to rise. When node 248 reaches a predetermined voltage, input 252 will go low, triggering signal generator 122 to fire or generate the wake up signal to switch POR circuit 116 from the powered-down state to the active state.

After signal generator 122 fires, node 250 goes high. When node 250 goes high, MOS transistor 238 turns on, bringing node 248 back low. As node 248 goes back low, wake-up circuit 118 can then continue to monitor Vdd.

Referring now to FIGS. 3A and 3B, the two graphs depicted illustrate an example of the timing of the operation of the present invention. In particular, line 310 of FIG. 3A depicts the operation of POR circuit 116 while lines 312, 314, 316, 318, 320 and 322 depict the operation or pulses of wake-up circuit 118. In FIG. 3B line 324 represents Vdd of power supply 110 over the same time frame as represented in the graph of FIG. 3A. In this example, 1.5 V is approximately the minimum operating voltage of electronic device 112.

As depicted in FIGS. 3A and 3B, as Vdd ramps from 0 volts to approximately 1.5 V, (from 0 to about 7 milliseconds) POR circuit 116 is generating an initialize signal to initial electronic device 112 (line 310). When Vdd reaches the 1.5 V minimum operating potential (about 7 milliseconds), POR circuit 116 shuts off or powers down and no longer sends the initialize signal to electronic device 112.

At about 9 to 10 milliseconds Vdd reaches a maximum voltage of about 2.7 volts and levels off. However at about 30 milliseconds Vdd starts to decay. From about 52 milliseconds to about 79 milliseconds as Vdd decays, lines 312–320 in FIG. 3A represent the pulses generated by wake-up circuit 118. Each of these pulses temporarily switch POR circuit 116 from the powered-down state to the active state. However, as can be seen in FIG. 3B, Vdd is still above the 1.5 V minimum operation potential. Therefore, POR circuit 116 does not assert its initialize signal and after each pulse (lines 312–320) POR circuit 116 switches back to power-down mode.

However, at about 81 milliseconds, when the pulse from wake-up circuit 118 (line 322) wakes-up or switches POR circuit 116 from powered-down to active, Vdd is below 1.5 V or the minimum operating potential. Therefore, POR circuit 116 will remain active and generate the initialize signal to reinitialize electronic device 112. POR circuit 116 generates the initialize signal until Vdd decays to zero volts or until Vdd increases and reaches above the minimum operating voltage, which occurs at about 145 milliseconds. POR circuit 116 then powers down again.

FIGS. 3A and 3B clearly depicts that by using wake-up circuit 118 with POR circuit 116, POR circuit 116 can be activated anytime the operating voltage is low enough for an incorrect operation and still minimize the power consumption by POR circuit 116.

CONCLUSION

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A power reset circuit, operable in response to changes, and the level of a power supply level, for generating a signal to switch the state of a component, wherein said component has at least two states, the first of which is a low-power standby state and at least one second active state, and wherein the switching occurs from the low-power standby state to at least one of the active state, said power reset circuitry comprising:

a means to couple both said power reset circuitry and said component to a power supply potential;

a detector coupled to said means to couple for detecting in the power supply potential level;

a signal generator coupled to said detector, said signal generator for generating the signal to switch the state of the component from the low-power standby state to the active state when said detector detects at least a selected amount of change in the power supply potential level; and a switching means to power-down at least a portion of said power reset circuitry upon the detection of the power supply voltage reaching a predetermined level and wherein said power reset circuit itself also has a low-power standby state.

2. A circuit as recited in claim 1, wherein:

said detector includes means for generating a reference potential; and said signal generator generates the signal when the power supply potential level is at least a selected amount less than said reference potential.

3. A circuit as recited in claim 2, wherein:

said reference potential generating means includes at least one capacitor.

4. A circuit as recited in claim 3, wherein:

said at least one capacitor is charged by the power supply.

5. A circuit as recited in claim 1, wherein:

said signal generator is a one shot pulse generator.

6. A circuit as in claim 1 wherein the predetermined level of the power supply voltage, at which at least a portion of said power reset circuit is powered down is a minimum operating voltage of the component.

* * * * *